United States Patent
Hendrickson

[11] Patent Number: 5,282,654
[45] Date of Patent: Feb. 1, 1994

[54] PIPE COUPLING SLEEVE

[75] Inventor: Thomas R. Hendrickson, Pelkie, Mich.

[73] Assignee: Quikcoup, Inc., Houghton, Mich.

[21] Appl. No.: 51,853

[22] Filed: Apr. 26, 1993

[51] Int. Cl.$^5$ .............................................. F16L 17/04
[52] U.S. Cl. .................... 285/112; 285/174; 285/411; 285/423; 285/238
[58] Field of Search .............. 285/406, 410, 112, 411, 285/423, 921, 174, 253, 257, 236

[56] References Cited

U.S. PATENT DOCUMENTS

| | | | |
|---|---|---|---|
| 2,142,768 | 1/1939 | Tompkins | 285/257 |
| 2,342,056 | 2/1944 | Lehman | 285/257 |
| 2,679,409 | 5/1954 | Spencer et al. | 285/257 |
| 3,156,489 | 11/1964 | Deringer | 285/112 X |
| 4,039,210 | 8/1977 | Wood et al. | 285/112 |
| 4,310,184 | 1/1982 | Campbell | 285/423 X |
| 4,466,640 | 8/1984 | Van Houtte | 285/174 X |
| 4,629,220 | 12/1986 | Crusco | 285/921 X |
| 4,660,865 | 4/1987 | Workman | 285/238 X |
| 5,139,290 | 8/1992 | Shafer | 285/112 |

FOREIGN PATENT DOCUMENTS

| | | | |
|---|---|---|---|
| 701311 | 1/1965 | Canada | 285/112 |
| 2102521 | 2/1983 | United Kingdom | 285/242 |

*Primary Examiner*—Dave W. Arola
*Attorney, Agent, or Firm*—Harness, Dickey & Pierce

[57] ABSTRACT

A narrow, thin, metal strip is arranged around the periphery of the end portion of at least one of two pipes arranged in axial alignment for forming a coupled joint. The adjacent pipe end portions are provided with circumferential grooves. A coupling surrounds the end portions of the pipes and has radially inwardly extending keys for fitting into the grooves in the pipes. The strip has a groove formation for fitting into and lining the groove formed in the end of the pipe upon which it is arranged. The localized pressure of the key fitted into the strip groove is dispersed through the strip into the adjacent pipe areas which the strip overlies to protect the pipe groove walls and base and the pipe-end portions from being damaged by engagement with the coupling key. The strip permits coupling a pair of relatively easily damaged plastic pipes or coupling a plastic pipe and a stronger metal pipe by resisting damage to plastic pipes caused by coupling key pressure.

9 Claims, 2 Drawing Sheets

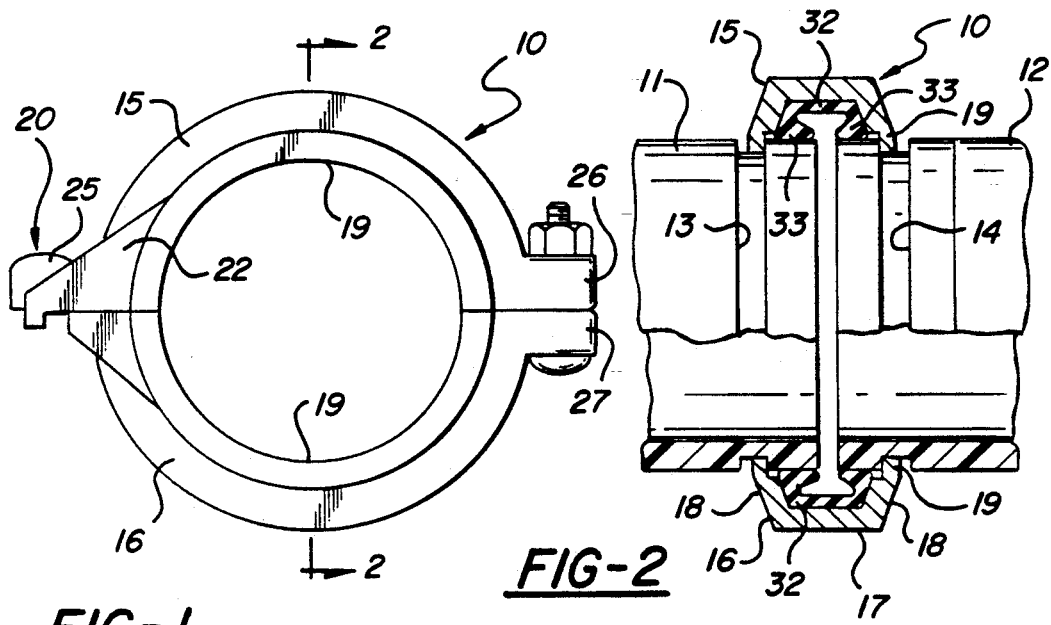
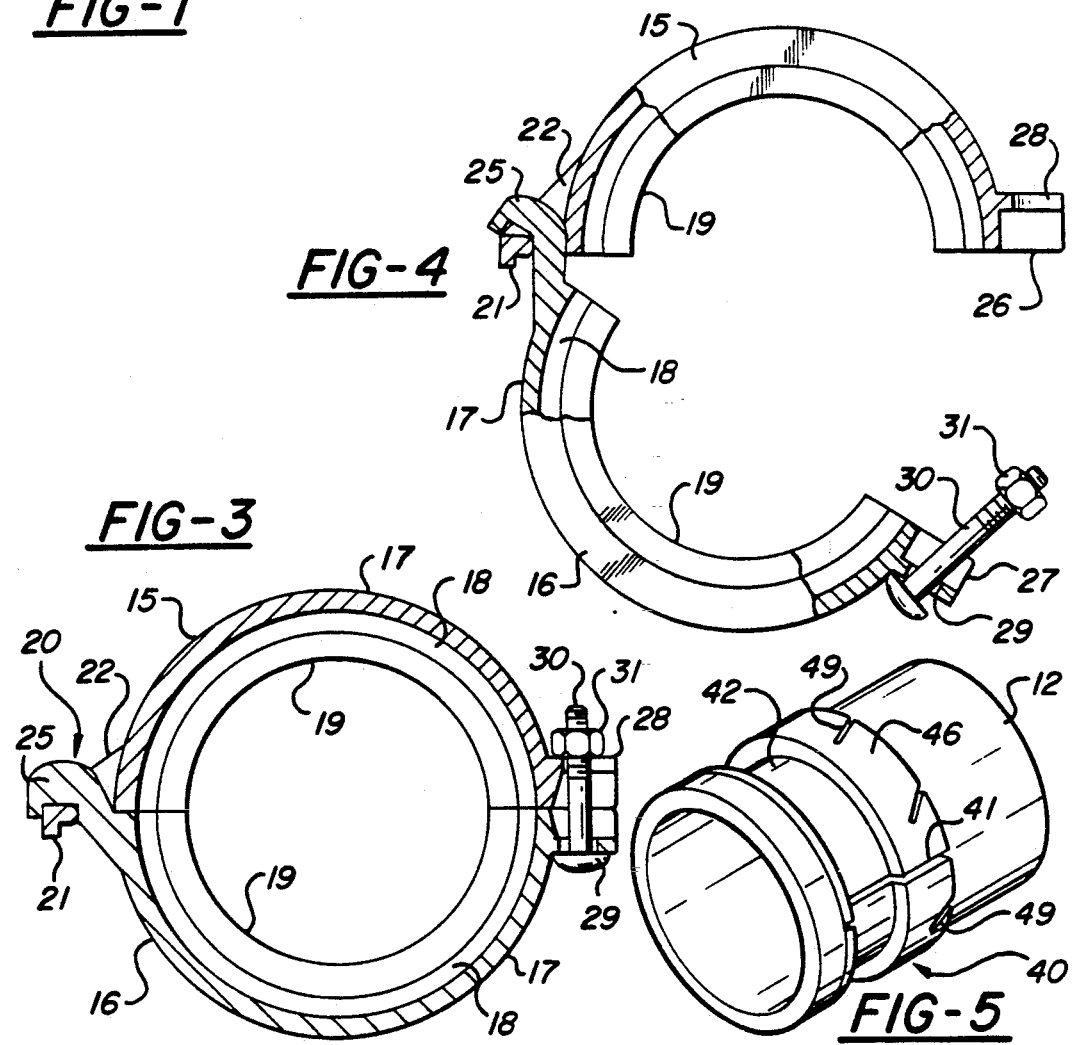

PIPE COUPLING SLEEVE

BACKGROUND OF THE INVENTION

This invention relates to a protective sleeve for use with a pipe coupling that couples together the ends of grooved pipes.

An example of such a type coupling is disclosed in my U.S. Pat. No. 4,966,395 issued Oct. 30, 1990 for a "Rigid or Flexible Coupling for Pipes." Similar types of couplings used for coupling adjacent pipe ends are disclosed in U.S. Pat. No. 4,915,418 issued Oct. 10, 1990 to Josef Palatchy for a "Hinged Pipe Coupling," and U.S. Pat. No. 5,018,768 issued May 28, 1991 to Josef Palatchy for a "Pipe Coupling Hinge." Numerous other prior patents disclose commonly used pipe coupling formed of two or more curved segments which are connected together end-to-end to form a circular coupling which is arranged to surround a pair of aligned pipe ends for joining the pipe ends together. This type of coupling device is U-shaped in cross-section to provide parallel, radially inwardly extending legs whose continuous, free, edges form keys. These free edges or keys fit into circumferentially arranged grooves provided near the free ends of the pipes to hold the pipes together. Normally, a rubber-like gasket is arranged within the coupling and surrounds the adjacent ends of the pipes for sealing them together.

Such couplings are commonly used in water distribution systems, as for example, for sprinklers systems within buildings, and other systems for conveying liquid. The pipes used in the particular system may be formed of metal or plastic materials. The couplings are normally formed of metal.

The keys of the couple engage locations on the walls or base of the pipe grooves and exert a pressure against these locations. The pressure may be exerted in a longitudinal direction against the walls forming the grooves in the pipes or in a radially inwards direction against the bases of the grooves in the pipes, depending upon the size and shape of the keys of the coupling or the grooves in the pipes. When the coupling segments are fastened together, such as by bolts securing adjacent ends together, the radially inwardly directed forces of the keys against the bases of the pipe grooves or the longitudinally directed forces of the keys against the walls of the couplings, are readily absorbed with normally no damage to the pipes as long as the forces exerted by the keys are limited.

Where plastic pipes are used, the plastic materials that form the grooved pipes normally do not have sufficient strength to resist key pressures resulting from overtightening the fasteners of the segments. That is, excessive key pressure on the pipe groove walls or bases can damage the pipes at or near the locations engaged by the keys. Thus, the amount of manually applied force used to connect the segments by bolts or other fasteners, must be carefully controlled to avoid overtightening which would otherwise damage the pipe ends and their grooves. Normally, the installer of a piping system limits the amount of forces applied to the fastening bolts or other types of fasteners to the point where the couplings do not damage the pipes themselves. But, there are instances where overtightening inadvertently occurs and damage results.

Similarly, this problem arises where thin wall metal pipes are used in a piping system. Moreover, it is normally not feasible to connect together a relatively stronger metal pipe with a relatively weaker plastic or metal pipe because normally, frequently, more forces are applied to the coupling segment fasteners when a stronger metal pipe is involved. That may be due to the need for tighter clamping around a heavier metal pipe or may be due to carelessness or inattentiveness on the part of the installing tradesman in overlooking the need to carefully limit the forces because of the weaker pipe. In any event, coupling a weak plastic to a strong metal pipe frequently results in the coupling device damaging the plastic pipe because the forces that would normally be absorbed by the metal pipe are sufficient to cause damage to the plastic pipe groove walls or bases or crack or crush the plastic pipes.

Thus, there is has been a need for a means to protect plastic pipes against damage caused by overtightening of coupling segments around the plastic pipe and, particularly, to protect relatively weaker plastic or metal pipes sufficiently so that they may be cou0led to relatively stronger metal pipes without damage to the weaker pipes.

SUMMARY OF THE INVENTION

This invention contemplates the provision of a protective pipe coupling sleeve in the form of a thin, narrow, strip of strong metal, such as stainless steel or the like, shaped as a grooved ring for manually positioning upon the grooved end of a plastic pipe by the pipe installer while applying a pipe coupling. That is, the strip has a pre-formed groove of a size and shape to closely fit into the groove in the plastic pipe and has an integral, narrow band which overlays a narrow, peripheral area of the pipe adjacent to its groove on the side remote from the end of the pipe. The ring-like strip is formed with a split so that it may be manually bent around the pipe end by the pipe installation tradesman just before applying the coupling upon an adjacent pair of pipe ends.

The groove formed in the protective strip covers the sidewalls and the base of the groove that is formed in the pipe, while normally leaving exposed the peripheral outer wall surface of the pipe which is located between the pipe groove and the adjacent end of the pipe. That is, the part of the pipe end which is located within the coupling housing and which is engaged by the gasket located within the coupling is bare of the sleeve.

More specifically, it is contemplated to utilize the protective sleeve with a conventional coupling with a U-shaped in cross-section housing which receives and holds the conventional gasket that surrounds the adjacent ends of a pair of aligned pipes. The free ends of the legs of the U-shaped coupling housing are formed as keys for fitting within the grooves of the pipe for locking the pipes and coupling together in the conventional manner. With the sleeve applied upon the pipe end, the inner or free ends of the coupling legs, which form the keys, engage against portions of the wall and base surfaces of the sleeve groove which line the surfaces of the walls and the base of the groove formed in the pipe. Thus, the pressure of the keys, particularly localized pressure, is absorbed and transmitted by the sleeve groove portions through the remainder of the sleeve, including through the integral band of the sleeve. In that way such pressure is also dispersed through the pipe. This protects the walls of the pipe groove from being damaged by localized longitudinally or axially directed pressure of the keys against them and protects the base of the groove from radially inwardly directed key pressures. Similarly, it protects the pipe itself, at the weakest location of the pipe, which is its grooved area, against cracking or crushing.

An objective of this invention is to provide a protective or reinforcing sleeve for use on the ends of plastic or similarly weak pipe ends so that such pipes may be readily coupled to each other or to a stronger metal pipe end without damage due to overpressurization of the coupling keys or due to overtightening of the coupling segment fasteners. It is particularly an objective to provide a means to make it feasible to couple plastic pipes to metal pipes without damage to the elastic pipe ends.

Another object of this invention is to provide a simplified protective metal strip or sleeve which is designed for manual application upon a pipe end by the piping installer, when needed, while coupling a pair of pipe ends, in the course of installing a piping system. Since the use of the sleeve is optional, the installer can use it only where necessary such as where substantial key pressure may be anticipated while applying a coupling to adjacent ends of a pair of plastic pipes or, to adjacent ends of a metal pipe and plastic pipe.

Still a further object of this invention is to provide an inexpensive means for use when desired by a piping installer to protect the frangible end portions of plastic pipes in a groove coupling-type of pipe joint system without interfering with normal gasket sealing of the pipe joints.

Yet another object of this invention is to provide an inexpensive, easily used, means for protecting the ends of plastic and weak metal pipes, during the coupling of the pipes to other plastic pipes or to metal pipes, against cracking or crushing or from localized overstressing due to localized pressures applied by the coupling keys, with the means being in the form of an inexpensive ring-like sleeve that may be optionally applied by the piping installer.

These and other objects and advantages of this invention will become apparent upon reading the following specification, of which the attached drawings form a part.

DESCRIPTION OF DRAWINGS

FIG. 1 is an elevational view of a pipe coupling formed of a pair of curved segments which are connected together by a hinge on one side and by a bolt and nut on the opposite side.

FIG. 2 is a cross-sectional view taken in the direction of arrows 2—2 of FIG. 1 and shows the coupling mounted upon a pair of adjacent pipe ends for coupling the ends together, and includes a conventional gasket arranged within the coupling for sealing the pipe ends together.

FIG. 3 is a view similar to FIG. 1, but shows the coupling segments in cross-section.

FIG. 4 is a view showing the hinged coupling sections swung open and partially in cross-section.

FIG. 5 is a perspective view of a pipe end with the protective sleeve mounted thereon.

DETAILED DESCRIPTION

Figure 6:
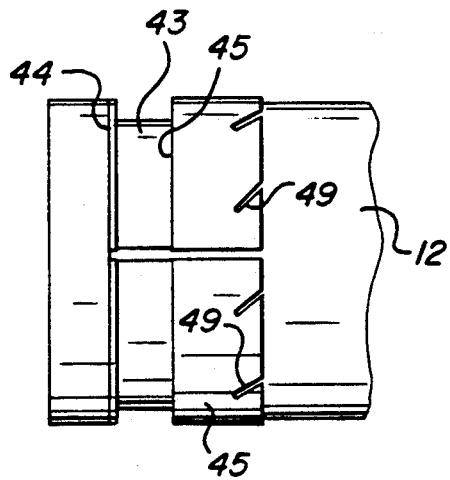
FIG. 6 is an elevational view of a portion of the end of a pipe with the sleeve mounted thereon.

Referring to the drawings, FIGS. 1-4 illustrate a coupling 10 used for coupling together the ends of a pair of aligned pipes. FIG. 2 shows one pipe end 11, formed of a plastic pipe material, and a second pipe end 12, formed of a metal material. Both pipe ends are provided with circumferential grooves 13 and 14, respectively.

The coupling is made of a pair of semi-circular, curved segments 15 and 16 which are joined together to form a circular ring which surrounds the adjacent ends of the pipes. The segments are U-shaped in cross-section, with each having a base 17 which encircles the pipe ends and inwardly directed legs 18, whose free edges form keys 19. The free edges or keys are arranged to fit into the grooves 13 and 14 that are formed on the pipes.

In the particular coupling illustrated in the drawings, the segments are connected together by a hinge 20. The hinge is formed of a hinge pin 21 which is part of hinge sides 22 that are integral with coupling segment 15. A hook-shaped hinge tongue 25, which is integral with segment 16, fits into the space, between the hinge pin 21 and hinge sides 22.

The opposite ends of the segments are provided with bolt lugs. Thus, segment 15 is provided with a lug 26 and segment 16 is provided with a lug 27. These lugs are U-shaped in cross-sectional configuration and are arranged to abut each other, as illustrated in FIG. 3.

The upper lug 26 is provided with an elongated slot 28 in its base and the lower lug 27 is provided with a hole 29 in its base. A headed bolt 30 is inserted through the hole 29 and extends through the slot 28 in the lug 26. A nut 31 secures the bolt to the lugs and serves to tighten the two lugs together and, thereby, to fasten the segments together.

Although the particular coupling illustrated in the drawings is formed with a hinge on one side and a bolt fastened pair of lugs on the opposite side, it is contemplated that the coupling may have lugs on both sides, instead of a hinge. In addition, the coupling may be formed a number of segments rather than only two. The particular structure of the coupling segments is not pertinent to the invention herein and therefore, various commercially available segments of the type generally described may be used.

When the coupling segments are fastened together, around the ends of pipes, a gasket 32 is arranged around the adjacent pipe ends, within the coupling segments. These gaskets are conventional and, typically, are provided with inner lips 33 which engage and seal against the peripheral surfaces of the adjacent pipe ends.

The ring-like pipe coupling sleeve 40, which is illustrated in FIGS. 5-9, respectively, is formed of a thin sheet metal, such as stainless steel. The sheet material may be almost paper-thin or somewhat thicker, as for example, about on the order of about 1/32nd of an inch or about 1 mm. The thickness may be varied, depending on the particular strength requirements. Those skilled in the art are able to select a proper metal, such as a stainless steel alloy or other suitable alloy, and of a suitable thickness for the purpose intended.

Figure 7:
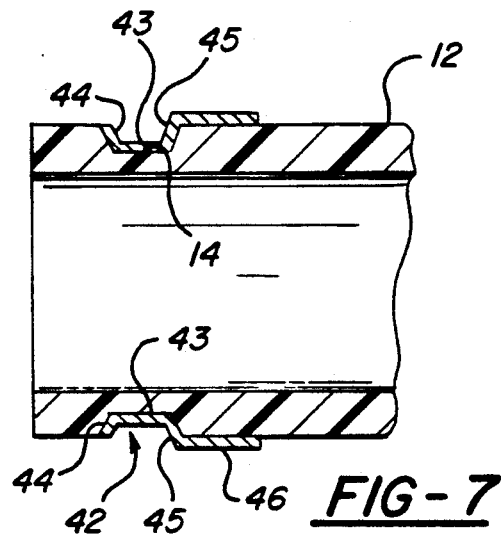
FIG. 7 is a cross-sectional view of a pipe end with the sleeve mounted thereon.
Figure 8:
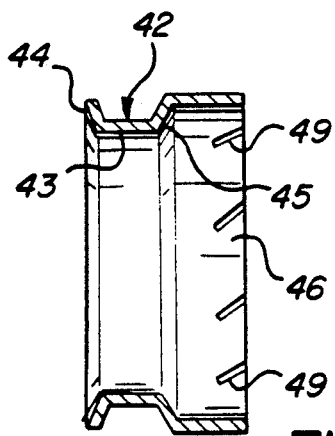
FIG. 8 is a cross-sectional view of the sleeve per se.
Figure 9:
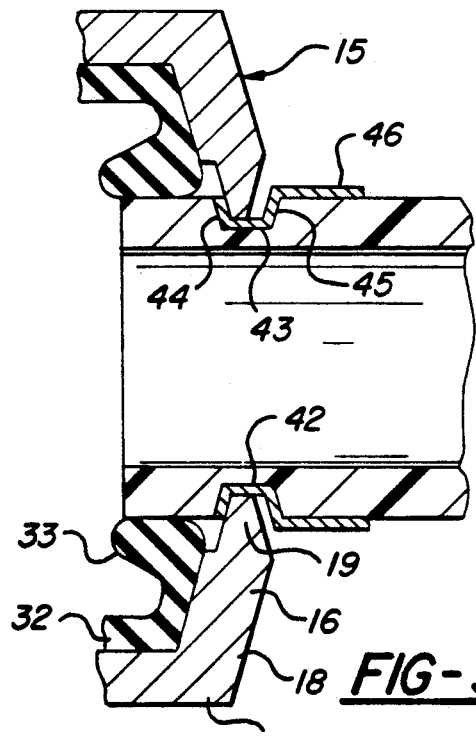
FIG. 9 is an enlarged, cross-sectional view of the end of the pipe, with the sleeve mounted thereon, and the key portion of the coupling, containing a gasket, engaged with the pipe groove and sleeve.

The sleeve is formed by initially providing a strip of metal which is bent into a circular shape. Thus, the ends of the metal strip are adjacent to each other as illustrated by the split 41 shown in FIG. 5. The strips are formed with integral channels or grooves 42 which provide a base 43, an inner wall 44 and an outer wall 45. As illustrated in FIGS. 7 and 8, the groove is preferably formed adjacent one edge of the strip, with the material located between the groove wall 45 and the opposite edge of the strip forming a narrow band 46.

The groove or channel formed in each strip is of a size and shape to snugly fit within and closely line the exposed wall and base surfaces of the groove formed in the pipe. The pipe groove may cut or be rolled into the pipe surface. Thus, the shapes and sizes of the grooves in such grooved pipes may vary somewhat. Consequently, the grooves or channels formed in the sleeve are shaped to fit the particular shape and size of the groove in the pipe end for which the sleeve is intended.

Figure 11:
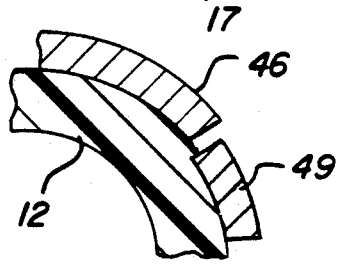
FIG. 11 is a schematic, substantially enlarged view, showing a fragment of the sleeve and the pipe to illustrate the slit in the sleeve which provides a sharp edge for biting into the plastic pipe.

The sleeve band 46 is provided with spaced-apart slits 49 which, preferably, are angled relative to the axis of the sleeve, as illustrated in FIG. 5. These slits, as shown in FIG. 11, provide exposed sharp metal edges which are arranged at an angle to the axis of the sleeve band. These sharp edges tend to bite into or to frictionally engage against the underlying surfaces of the pipes upon which such sleeve are mounted. In addition, slits make the sleeves more easily bendable to fit around the pipes. As mentioned, FIG. 11 schematically shows a sharpened edge along one side of the illustrated slit 49 biting into the adjacent surface of the pipe 12.

Figure 10:
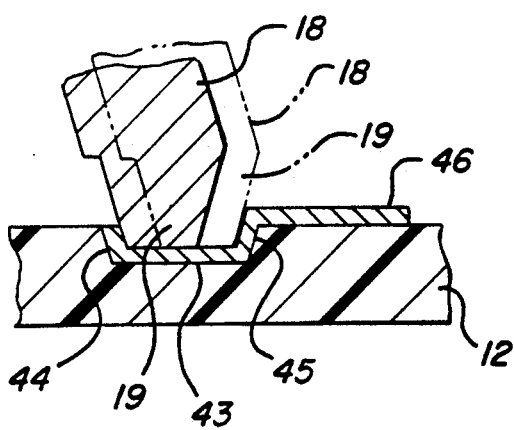
FIG. 10 is an enlarged, cross-sectional, fragmentary view showing a portion of the key in one longitudinal position, in solid lines, and in another longitudinal position, in dotted lines, fitted within aligned grooves formed in the sleeve and in the pipe.

The thin, narrow sleeve protects the end of a pipe against damage due to either radially inwardly directed pressure of a key or by key pressure directed in an axial or longitudinal direction. The solid line drawing of the key in FIG. 10 shows pressure exerted in one direction against one wall of the sleeve and pipe groove and the dotted line drawing of the key shows the key exerting pressure against the walls in the opposite direction.

In use, the pipe system installer normally uses couplings, such as the type illustrated in FIGS. 1-4, to couple together adjacent pipe ends. However, depending upon the overall design of the piping system or the need for special handling of a particular coupling location, the installer may position a sleeve around the particular pipe ends which are of concern. He is able to carry with him a number of such sleeves of different diameters to fit the different diameter couplings and joints on a particular piping system, such as a water distribution system in a sprinkler installation. The sleeve prevents such damage as breaking the edges of the walls of the pipe grooves, crushing of the pipes, cracking of the pipes, etc. Such damage would not be visually discerned and, therefore, might not be detected until liquid is flowed through the system and leaks occur. Significantly, the installer is able to couple metal and plastic pipes together with the application of a sufficient amount of force upon the fasteners to lock the coupling and pipes to each other without fear of damaging the plastic pipe due to slight overtightening of the fasteners.

This invention may be further developed within the scope of the following claims. Having disclosed an operative embodiment of this invention, I now claim:

1. A pipe coupling sleeve for a coupling formed of curved segments which are joined together end-to-end to encircle the adjacent ends of axially aligned pipes for coupling the pipe ends together, with the segments being generally U-shaped in cross-section to provide radially inwardly extending legs whose free inner edges form substantially continuous keys, and with the end portions of the pipes having circumferentially extending grooves defined by walls and a base therein for receiving the keys to lock the coupling and pipe-end portions together, comprising:

said sleeve comprising a thin, narrow strip of metal bent into the shape of a circular ring of a diameter to closely surround one of the pipe end portions and having a longitudinal axis, and with the ring being split so that it may be opened or closed and manually applied around and manually removed from the periphery of the pipe-end portion;

a continuous narrow channel formed in the strip adjacent one edge thereof and spaced a considerable distance from the opposite edge thereof, said channel having a base and sidewalls which correspond in size and in shape to the size and shape of the walls and base forming the groove in the pipe-end portion and being closely fitted within said pipe groove to form a metal liner for the groove portions against which the coupling key engages;

and with the strip portions located between the channel and said strip opposite edge forming a narrow band arranged in substantially complete face-to-face overlying contact with the corresponding peripheral area of the pipe portion located adjacent the pipe groove;

a number of spaced apart slits formed in the sleeve band and with the slits angled relative to said longitudinal axis of the sleeve to form sharp edge portions which are at an angle to said longitudinal axis of the sleeve band and are substantially parallel to its opposing edge portion defined by the slits for frictionally engaging with the adjacent pipe surface areas which the slits overlie;

whereby any pressures of the key against the areas of the groove walls and base which are engaged by the key are dispersed through and substantially absorbed by the wall and base areas of the sleeve channel and are transmitted to, and are dispersed in the sleeve band into the pipe area adjacent the pipe groove.

2. A construction as defined in claim 1, and said one pipe being formed of a plastic material which is relatively soft and frangible compared with a metal pipe material.

3. A construction as defined in claim 2, and said other pipe being of a metal material.

4. A construction as defined in claim 2, and with the second pipe also being formed of a similar plastic material and including a second sleeve similar in construction to said first mentioned sleeve and similarly applied to said second pipe.

5. A method for dispersing localized forces and pressures on the walls and bases of grooves formed in the end portions of aligned adjacent first and second pipe ends that are coupled together by a generally circular coupling which surrounds the portions defining the pipe ends wherein each pipe end has a longitudinal axis and which coupling is provided with substantially continuous, narrow, circular keys which fit into annular grooves formed in the pipe end portions adjacent the ends thereof, for holding the pipes together, comprising:

forming an elongated, narrow strip of thin, bendable metal of a length corresponding to the circumferential length of at least one of the two pipes;

forming a continuous groove in the strip along one edge thereof, with the groove having a base and walls corresponding to the shape and size of the corresponding walls and base of the groove formed in the one pipe for closely fitting within the groove in that pipe, and with the strip groove spaced a considerable distance from the opposite edge of the strip to form an integral, narrow band on the strip;

forming a number of spaced apart slits in the sleeve band and with the slits angled relative to the axis of the one pipe to form sharp edge portions which are at an angle to the axis of the one pipe and are substantially parallel to its opposing edge portion defined by the slits for frictionally engaging with the adjacent pipe surface areas which the slits overlie;

bending the strip around the end portion of the one pipe with the strip groove closely seated within the pipe groove and the band arranged in substantially complete face-to-face engagement with the surface of the pipe which the band overlies;

then applying the corresponding keys within the grooves in the strip and pipes and fastening the coupling in position around the pipe-end portion for forming the coupled joint;

wherein forces applied by the key within the strip groove are dispersed and transmitted to the areas of the pipe which are overlapped by the strip groove and strip band portions.

6. A method as defined in claim 5, and forming the band of a width which is greater than the width of the strip groove measured in the axially direction of the circularly bend strip.

7. A method as defined in claim 5, and including selecting said pipe from pipes formed of a plastic material.

8. A method as defined in claim 5, and including forming a similar second strip of a size and shape, including with a groove and band portion, to overlie the other pipe-end portion and similarly applying the second strip around the end portion of the other pipe before inserting its corresponding coupling key within its groove.

9. A method as defined in claim 5, and including the pipe around which the strip is arranged being formed of a plastic material and the other being formed of a metal material form coupling the two together.

* * * * *